United States Patent
Bergmann et al.

(10) Patent No.: US 6,957,778 B2
(45) Date of Patent: Oct. 25, 2005

(54) SANITARY MIXING UNIT

(75) Inventors: Konrad Bergmann, Trier (DE); Josef Ems, Wittlich (DE)

(73) Assignee: Ideal-Standard GmbH & Co. oHG, Bonn (DE)

( * ) Notice: Subject to any disclaimer, the term of this patent is extended or adjusted under 35 U.S.C. 154(b) by 0 days.

(21) Appl. No.: 10/381,934

(22) PCT Filed: Sep. 8, 2001

(86) PCT No.: PCT/EP01/10382

§ 371 (c)(1), (2), (4) Date: Aug. 19, 2003

(87) PCT Pub. No.: WO02/27224

PCT Pub. Date: Apr. 4, 2002

(65) Prior Publication Data

US 2004/0016815 A1 Jan. 29, 2004

(30) Foreign Application Priority Data

Sep. 29, 2000 (DE) .......................... 100 48 041

(51) Int. Cl.⁷ ............................................. G05D 23/13
(52) U.S. Cl. ................... 236/12.2; 137/625.4
(58) Field of Search .................... 236/12.2; 137/625.17, 137/625.4

(56) References Cited

U.S. PATENT DOCUMENTS 4,299,354 A * 11/1981 Ketley ..................... 236/12.11
4,995,419 A * 2/1991 Pawelzik et al. ............ 137/316
5,340,018 A * 8/1994 MacDonald ................ 236/12.2
5,535,943 A * 7/1996 Kahle et al. ................ 236/12.2
6,279,831 B1 * 8/2001 Lorch ....................... 236/12.13
6,360,956 B1 * 3/2002 Taylor et al. ............... 236/12.2
6,454,175 B1 * 9/2002 Lorch ......................... 236/12.2
6,517,006 B1 * 2/2003 Knapp ........................ 236/12.2
6,557,770 B2 * 5/2003 Mace et al. ................. 236/12.1

FOREIGN PATENT DOCUMENTS

| CH | 648 390 A | 3/1985 |
| EP | 0 611 260 A | 8/1994 |
| WO | WO 97 01807 A | 1/1997 |

* cited by examiner

*Primary Examiner*—William E. Tapolcai
(74) *Attorney, Agent, or Firm*—Nixon Peabody LLP; David S. Safran

(57) ABSTRACT

A sanitary mixing unit (1), in particular for wall installation, has a cartridge (6) with an outer housing (12), a flow adjustment device, a temperature adjustment device and a thermostatic device, in which the flow adjustment device has a fixed valve disc (13) and a rotatable valve disc (14) which co-acts with the fixed valve disc. A sanitary mixing unit which is of simple and economical construction and in which a functional matching of the inlet connections for hot and cold water can be matched to the locations of the hot and cold water supplies is provided by an inner housing (15), which can be coaxially rotated relative to the outer housing (15) having the thermostat device arranged in it, the rotatable valve disc (14) being fixed to the inner housing (15) and the fixed valve disc being fixed to the outer housing (12).

17 Claims, 4 Drawing Sheets

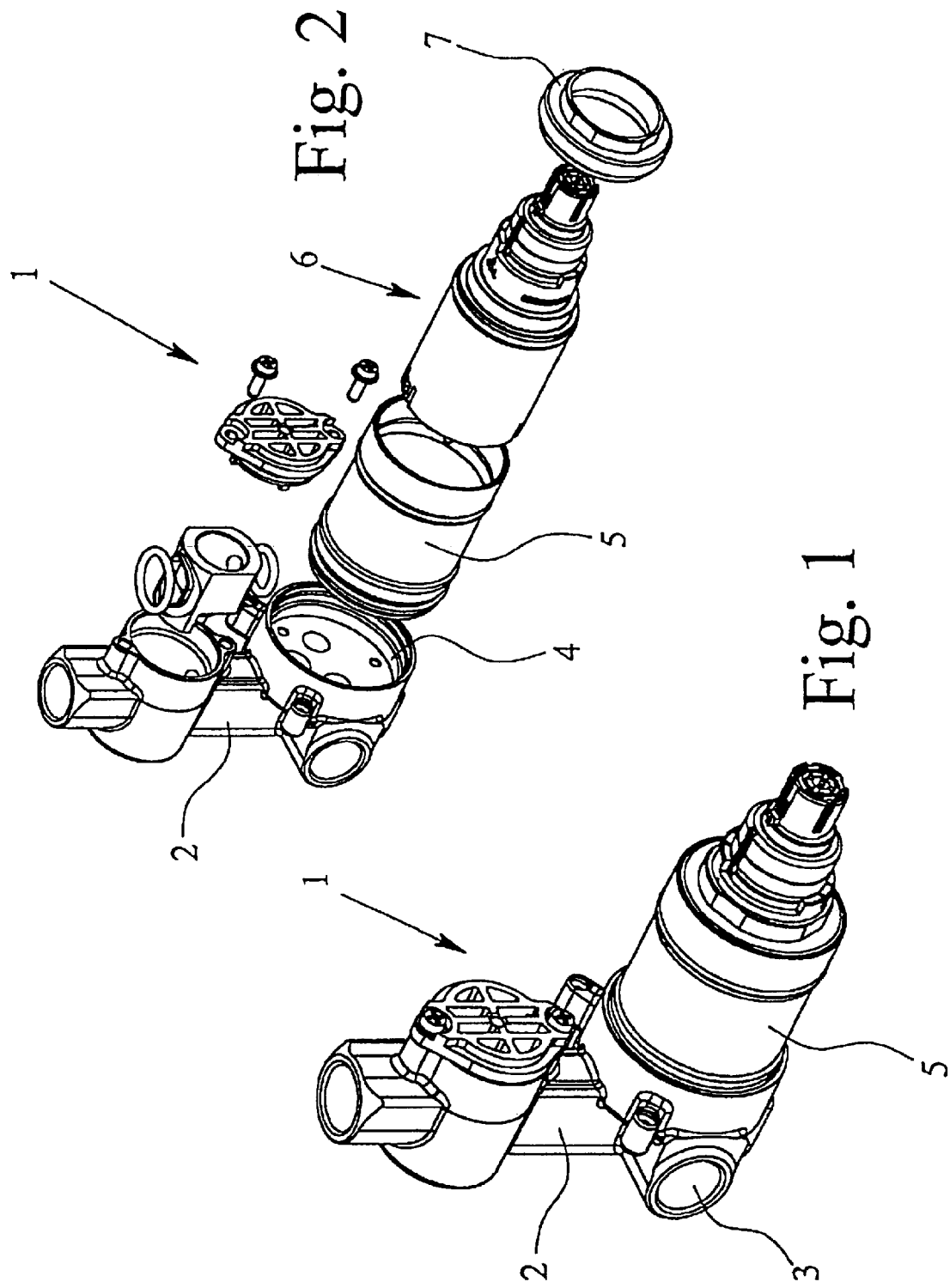

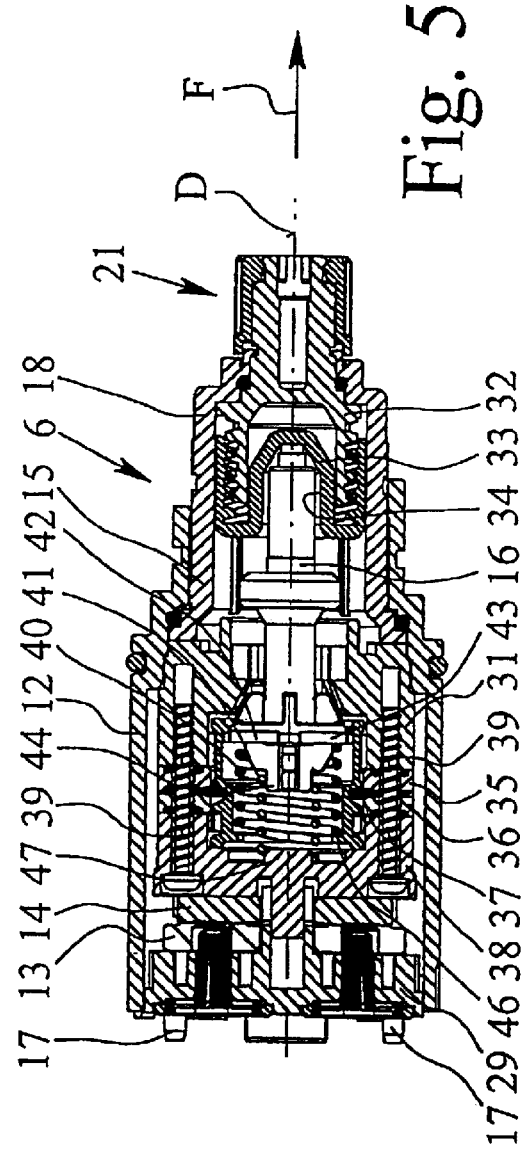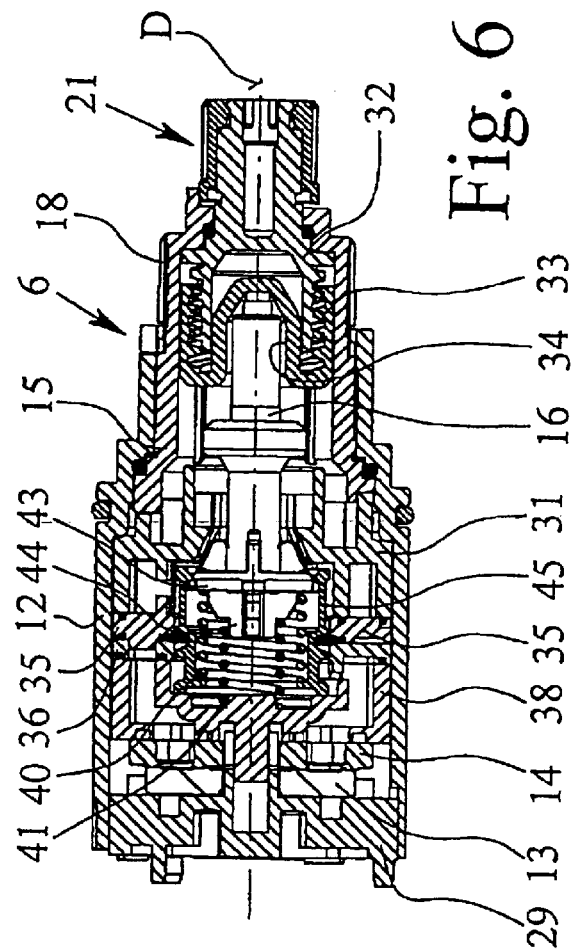

SANITARY MIXING UNIT

BACKGROUND OF THE INVENTION

1. Field of the Invention

The invention relates to a sanitary mixing faucet, especially for wall installation, with a cartridge which has an outside housing, with a quantity adjustment means, a temperature adjustment means, and a thermostat means, the quantity adjustment means having a stationary valve disk and a rotating valve disk which interacts with it.

2. Description of Related Art

Mixing faucets of the type under consideration are known in various versions. In these mixing faucets, cold water must be delivered to the cold water part of the mixing chamber from the cold water supply and hot water to the hot water part of the mixing chamber from the hot water supply. For laterally transposed installation of such a mixing faucet, therefore with installation with a connection of the cold water supply to the hot water line and of the hot water supply to the cold water line, this mixing faucet operates without special measures with a reversed actuation direction, and in the embodiment, does not act at all as a thermostat mixing faucet.

Since laterally transposed installation of the water supplies often takes place due to errors by the installer or due to structural circumstances, in modern mixing faucets, provisions are often made for the assignment of the cold water supply to the cold water part and of the hot water supply to the hot water part to be interchangeable.

Published German Patent Application 35 41 986 discloses a mixing faucet with a mounting shaft into which the supply lines of the cold and hot water are routed and in which there is a blind hole for holding an intermediate piece. To enable laterally transposed installation, it is provided that, in the blind hole, selectively, an intermediate piece with water delivery channels which are made crossed or parallel, is inserted for the cold and hot water inflow. The disadvantage in this known mixing faucet is that two different types of intermediate pieces are necessary to enable matching to the actual supply conditions. Another disadvantage is that the mounting shaft and thus also the intermediate piece occupy a relatively large amount of space; this has an adverse effect on the construction depth of the mixing faucet.

Furthermore, published German Patent Application 37 30 375 discloses a mixing faucet in which in the area of the cold water supply and the hot water supply flow guide inserts are interchangeably inserted into the base body of the fittings and are interchangeable with one another. In this embodiment special components are also necessary to undertake the correct matching to the supply conditions.

SUMMARY OF THE INVENTION

The object of this invention is to provide a sanitary mixing faucet of the initially mentioned type in which operational matching of the inflow conditions to the actual supply conditions is easily and economically possible.

This object is achieved in accordance with the invention essentially in that, in the outside housing, the inside housing is supported to be able to turn coaxially relative to it by at least 180°, that there is a thermostat means in the inside housing, that the rotating valve disk is joined rotationally fixed relative to the inside housing, and that the stationary valve disk is rotationally fixed relative to the outside housing.

The embodiment of the invention offers a series of in part major advantages.

First of all, to adapt to the actual supply conditions no additional components or changes on the base body of the fittings are necessary. Structural modifications to ensure laterally transposed installation are limited to changes on the cartridge without however this leading to an increase of the dimensions of the cartridge. Depending on the application, it is simply necessary to turn the inside housing by 180° relative to the outside housing. The outside housing itself with the stationary valve disk remains in its arrangement or installation position in the base body of the fittings and is not turned.

Structurally, it is an especially good idea to route an engagement section of the inside housing, that serves for seating of the first twist operating handle for adjustment of the quantity of mixed water, out through an end face of the outside housing. This embodiment has the advantage that the twist operating handle for adjusting the quantity can be easily slipped onto the projecting engagement section. After removing the twist operating handle, the inside housing can be turned by 180° in the above described manner relative to the outside housing if this is necessary with respect to the installation conditions.

Furthermore, it is favorable for temperature adjustment if the temperature adjustment means has an engagement section which projects out of an end face of the inside housing for seating a second twist operating handle for temperature adjustment. On the end face, the cartridge thus has two engagement sections which both project beyond the outside housing so that the two twist operating handles can be easily mounted and actuated easily on the end face. Otherwise, based on the selected arrangement and execution, it is such that the first twist operating handle and the second twist operating handle have the same axis of rotation.

In order to be able to quickly and easily adjust the quantity, the valve openings of the valve disks are made such that the maximum opening cross section arises after rotation of less than 180°, preferably roughly 90°. An order to obtain a defined closed and open position in this connection, there are means for limitation of the rotation of the first twist operating handle. In one preferred embodiment, the means for limitation of rotation have a guide groove which is provided especially on the outside housing, and a projection which is guided in the guide groove and which is preferably provided on the first twist operating handle.

Since the embodiment in accordance with the invention allows rotation of the inside housing relative to the outside housing, to easily find the supply position desired at the time, it is a good idea to provide markings on the outside housing and the inside housing which correspond to one another for indicating the state of rotation of the inside housing relative to the outside housing. When the markings agree, then either one or the other supply position is reached.

Basically it is possible to configure the cartridge such that it is open on the bottom so that the individual components can be removed if necessary. However, it is preferable for a bottom plate to be provided on the bottom for sealing the cartridge to be mounted on the outside housing. In this way, the entire cartridge becomes a unit which is easy to handle and which easily enables adjustment of the inside housing relative to the outside housing and otherwise can be easily mounted and if necessary replaced.

In one preferred embodiment, it is provided that the bottom plate is locked to the outside housing. This connection can be easily established and ensures reliable sealing of the cartridge. In this regard, it is especially feasible to keep the stationary valve disk rotationally fixed on the bottom plate.

Since the cartridge of the invention contains a plurality of components, in order to ensure simple installation of the individual components, the inside housing can be easily be made in several pieces. However, in this case, it is necessary for adjacent parts of the inside housing to be joined to one another in a manner preventing relative rotation therebetween.

Otherwise, it goes without saying that this invention is not limited solely to the sanitary mixing faucet, but also relates to a cartridge of the above described type.

One embodiment of this invention is explained in detail using the accompanying drawings.

BRIEF DESCRIPTION OF THE DRAWINGS

FIG. 1 is a perspective view of part of the mixing faucet in accordance with the invention, FIG. 2 is an exploded view of part of the sanitary mixing faucet shown in FIG. 1, FIG. 5 is a cross-sectional view of a cartridge in accordance with the invention, FIG. 6 is a cross-sectional of the cartridge shown in FIG. 5 rotated 90° about its longitudinal axis relative to the representation of FIG. 5

DETAILED DESCRIPTION OF THE INVENTION

Figure 3:
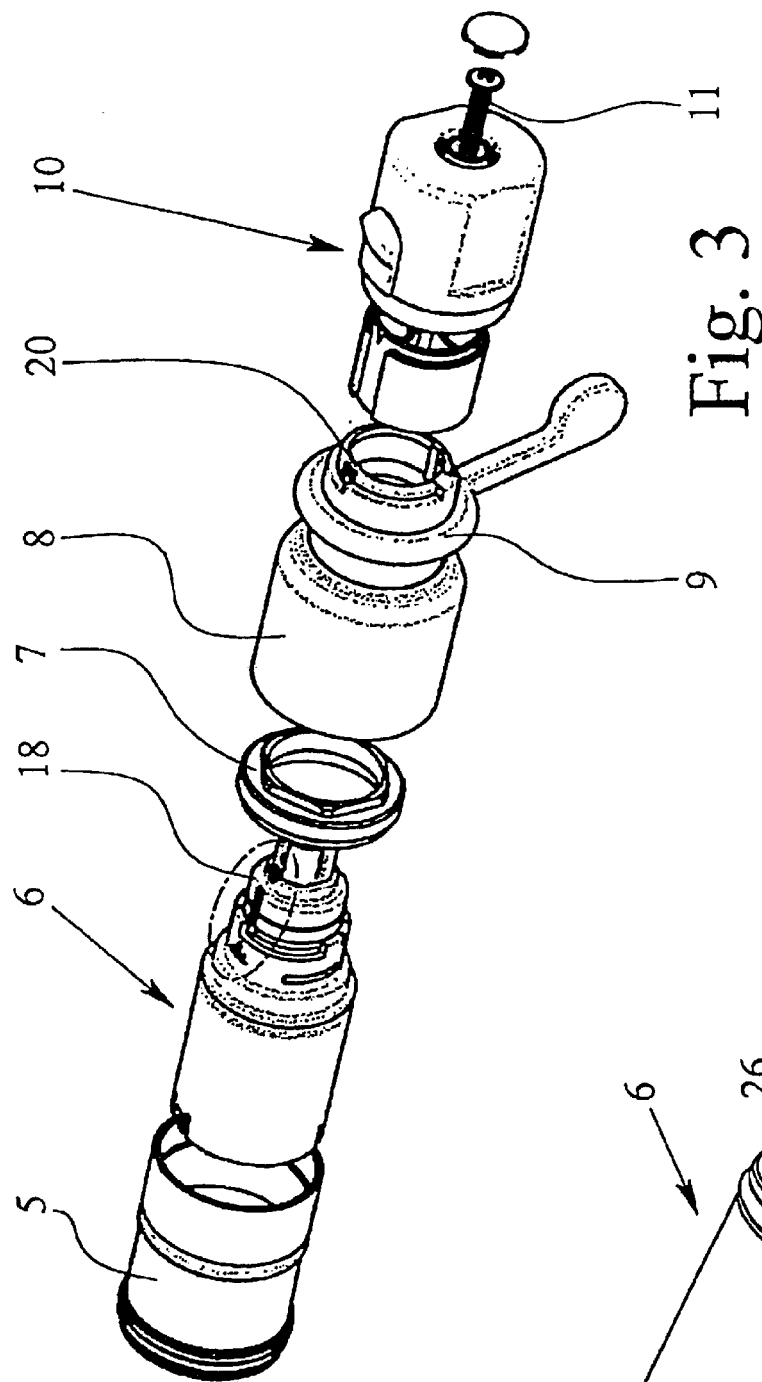
FIG. 3 is an exploded view of parts of the mixing faucet of the invention.
Figure 4:
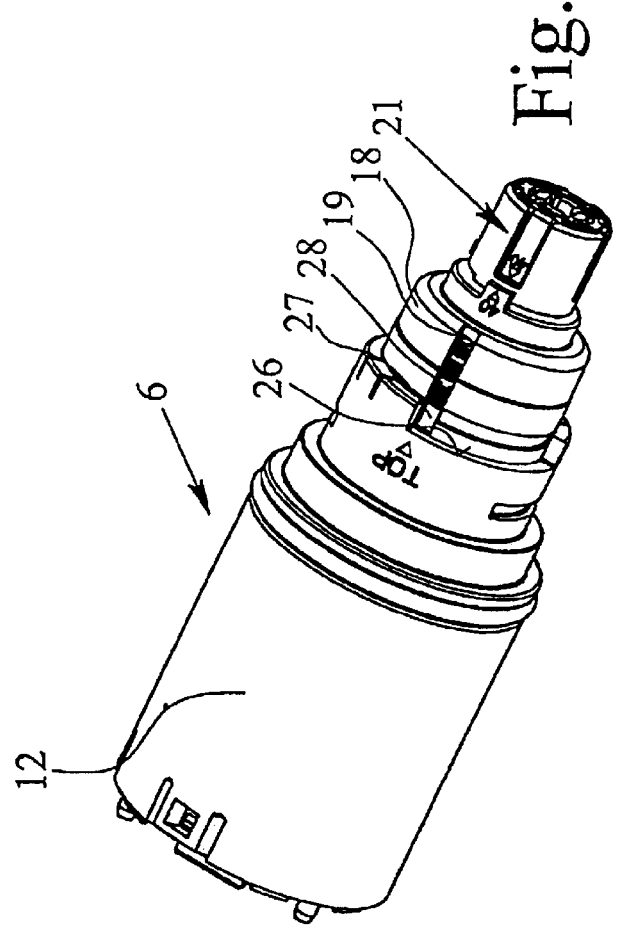
FIG. 4 is an enlarged perspective view of a cartridge according to the invention.

FIGS. 1 and 2 show parts of a sanitary mixing faucet 1 which is intended especially for wall installation. The mixing faucet 1 has a base body 2 which has a cold water supply connection 3, and on the opposite side, a hot water supply connection (not shown). A receiving sleeve 5 for a cartridge 6 is locked into the receiver 4 of the base body 2. The cartridge 6 makes it possible to adjust the amount and temperature of the mixed water. For this purpose, the mixing faucet 1 has a quantity adjustment means and a temperature adjustment means in the cartridge. Furthermore, there is a thermostat means in the cartridge 6. The cartridge 6 is fixed in or on the receiving sleeve 5 via a locking nut 7.

Supplementing the parts shown in FIG. 2, FIG. 3 shows a covering sleeve 8 which is pushed over the receiving sleeve 5, a first twist operating handle 9 and a second twist operating handle 10 which is composed of several parts and which can be attached to the front of the cartridge 6 via a screw 11.

As follows especially from FIGS. 5 and 6, the mechanism for controlling the amount and temperature is implemented in or on the cartridge 6. The cartridge 6 itself, for this purpose, has an outside housing 12 in which, among others things, there are a stationary valve disk 13 and a rotating valve disk 14 of the quantity adjustment means which interacts with the stationary valve disk 13.

It is significant, at this point, that the inside housing 15 can be turned coaxially in the outside housing 12 by at least 180° around the axis D which is the central lengthwise axis of the cartridge 6. There is a thermostat means which has a thermostatic element 16 in the inside housing 15 and it is thus turned at the same time when the inside housing 15 is turned relative to the outside housing 12. Furthermore, the rotating valve disk 14 is held on the inside housing 15 so that the valve disk 14 is turned at the same time as the inside housing 15 is turned relative to the outside housing 12. Conversely, the stationary valve disk 13 is fixed relative to the outside housing so that when the inside housing 15 turns, relative motion of the movable valve disk 14 takes place with respect to the stationary valve disk 13 which is not moving.

As a result, the aforementioned configuration means that the cartridge 6 which is inserted into the receiving sleeve 5 and the receiver 4 of the base body 2 does not have to be removed from the above described installation position for adaptation to the respective structural circumstances, but that simply the inside housing 15 only need be turned by 180° around the axis D in order to ensure faultless operation of the mixing faucet 1 depending on the location of the water supplies. In order to otherwise prevent, in this connection, the outside housing 12 from turning at the same time as the inside housing 15 turns, there are the corresponding fixing projections 17 on the end of the cartridge 6 for interaction with openings (not shown) on the base body or on the receiver 4.

On the end face, i.e., on the side facing the user, the engagement section 18 of the inside housing 15 is routed out of the outside housing 12. The first twist operating handle 9 for adjustment of quantity can be slipped onto the engagement section 18. To slip the first twist operating handle 9 onto the engagement section 18 and to hold the twist operating handle 9 against relative rotation, a groove 19 runs in the lengthwise direction of the cartridge 6 and it interacts with a corresponding projection 20 on the first twist operating handle 9. In the embodiment shown, there are corresponding grooves 10 and projections 20 on opposing sides of the engagement section 18 and in the corresponding insertion opening of the first twist operating handle 9, respectively.

To be able to adjust not only the amount, but also the temperature from the end face of the cartridge 6, the temperature adjustment means has an engagement section 21 which projects out of the end face of the inside housing 15 for seating of the second twist operating handle 10. In the installed state, with the twist operating handles 9, 10 attached, the first twist operating handle 9 and the second twist operating handle 10 have the same axis of rotation, the axis D.

Figure 7:
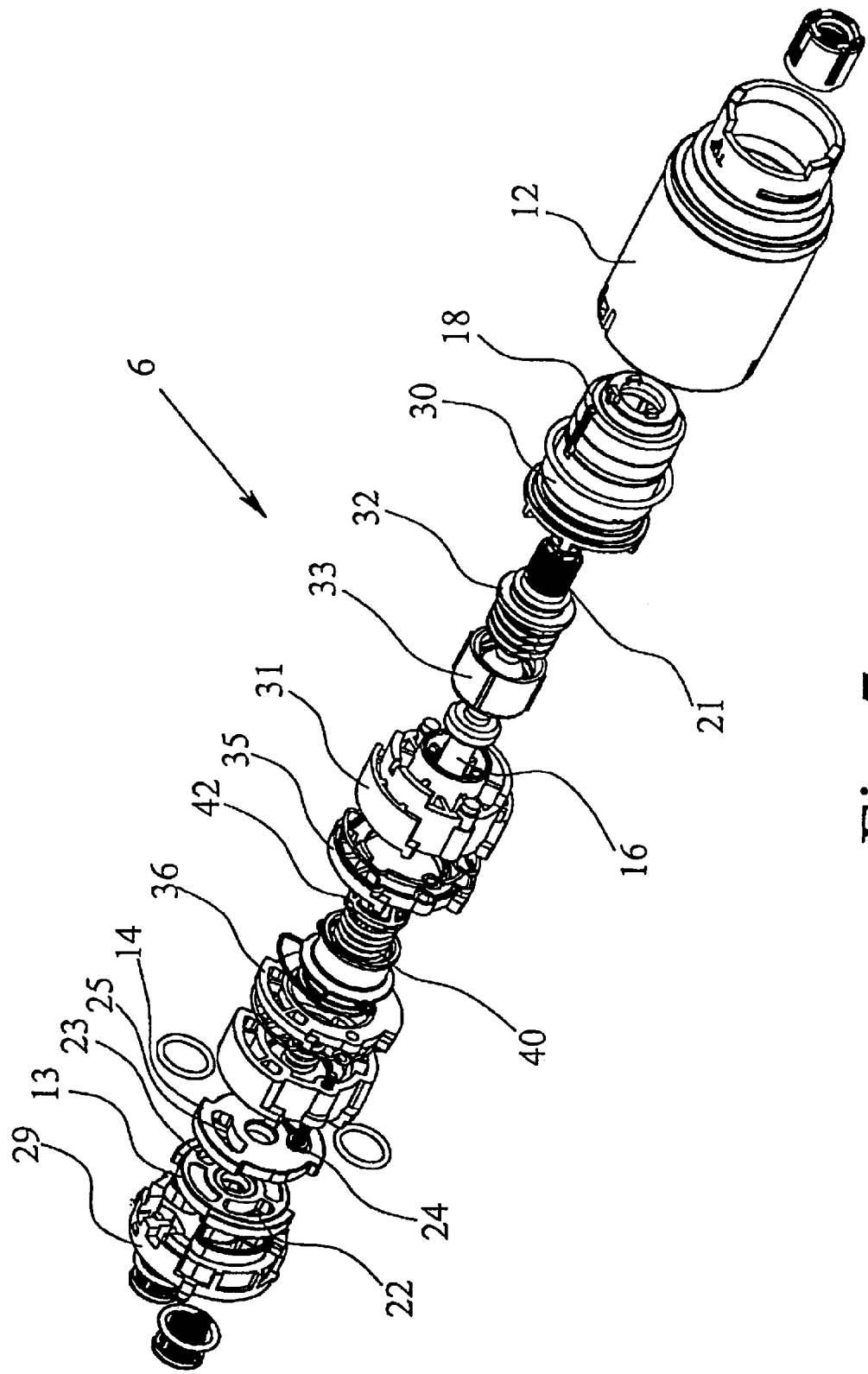
FIG. 7 is an exploded view of the individual parts of the cartridge in accordance with the invention.

As follows from FIG. 7, the valve openings 22, 23, 24, 25, which are provided in the valve disks 13, 14, extend over less than 90°, so that the maximum opening cross section arises after a rotary motion of roughly 90°.

Basically, it can be provided that the inside housing 15 can be turned by only 180° relative to the outside housing 12 by corresponding stops. However, there are no such stops here. For adjusting the amount, there are means for limiting the rotation of the first twist operating handle 9 which enable rotation of only roughly 90°. In particular, the means for limiting rotation of the first twist operating handle 9 comprises a guide groove 26 which runs on the periphery of the outside housing 12 and into which the projection 20 fits. The guide groove 26 extends over an arc length of roughly 90° so that the maximum rotation of the first twist operating handle 9 is dictated by this. Otherwise, on the outside housing 12 and on the projecting engagement section 18 of the inside housing 15 there are the corresponding markings 27, 28 for indicating the state of rotation of the inside housing 15 relative to the outside housing 12.

As follows especially from FIGS. 5 and 6, the cartridge 6 with the components contained in it represent an inherently manageable and closed unit. The cartridge 6 is comprised of a host of components which are shown in particular in FIG. 7, even if not all parts are described in particular. A bottom plate 29, which is locked to the outside housing 12, is used to close the cartridge 6. Here, the stationary valve disk 13 is held on the bottom plate 29 so that, in this way, rotation of the stationary valve disk 13 relative to the outside housing 12 is easily prevented.

As follows from FIGS. 5 to 7, the inside housing 15 is made in several parts, adjacent parts of the inside housing 15 being connected so as not to be rotatable relative to one another. The inside housing 15 has an upper inside housing part 30 with the engagement section 18. The inside housing part 30 is connected to the inside housing part 30, between the two inside housing parts 30, 31 there being a set screw 32 and an adjustable nut 33 for achieving axial motion of the thermostatic element 16 and the associated components. On the outside, on the set screw 32, there is an engagement section 21 for the second twist operating handle 10 for adjustment of the temperature. Furthermore, between the two inside housing parts 30, 31, there is a thermostatic element 16 which is made as an expansion element and which is held with one end in a corresponding receiver 34 of the adjustable nut 33.

The inside housing part 31 adjoins two other comparatively narrow inside housing parts 35, 36, between which a sealing membrane 37 is held. Finally, there is a lower inside housing part 38 which adjoins the inside housing part 36. For bracing the sealing membrane 37, the inside housing parts 31, 35, 36 and 38 are screwed to one another via the corresponding screws 39.

As follow especially from FIGS. 5 and 6, a reset spring 40 and an over-travel spring 41 are also located within the cartridge 6 and act on the thermostatic element 16.

In this connection, it is important that the reset spring 40 and the over-travel spring 41 act on the thermostatic element 16 in the same direction, here, specifically in the direction of the arrow F, so that the spring forces of the reset spring 40 and the over-travel spring 41 are added to one another in the case of over-travel, therefore when the length of the thermostatic element changes.

In this embodiment, the reset spring 40 and the over-travel spring 41 are located on the same side with respect to the thermostatic element 16. Here, an especially space-saving arrangement is achieved in that the reset spring 40 and the over-travel spring 41 are each made as helical springs, the over-travel spring 41 being located within the reset spring 40.

To transfer the spring forces of the reset spring 40 and the over-travel spring 41 to the thermostatic element 16 and to make contact between these springs, a receiving part 42 is used which is cross-shaped and has flow openings. The receiving part 42 has an external flange-like engagement section 43 and an end-side journal 44. The reset spring 40 adjoins the engagement section 43, while the over-travel spring 41 is seated on the journal 44. The thermostatic element 16 rests on the opposite side of the receiving part 42. The reset spring 40 and the over-travel spring 41 exert roughly the same spring force, specifically roughly 50 N each.

A sleeve 45 which is supported in the inside housing 15 is used as the temperature control part on which the thermostatic element 16 acts. Here, the receiving part 42 is located within the sleeve 45 and is pressed via the reset spring 40 against the inner stop of the sleeve 45. The sleeve 45 has control edges on its end faces for each of the hot and cold water flows. The hot water control edge is located on the left side, the cold water control edge on the right side of the sleeve 45.

In order to optimally use the available space in the inside housing 15, the reset spring 40 and the over-travel spring 41 are located within the sleeve 45. In doing so, the reset spring 40 which is used to reset the sleeve 45 is supported on the peripheral collar 46 of the sleeve 45 on the side opposite the receiving part 42, while the over-travel spring 41, which is also used to hold the thermostatic element 16, is supported on the inside housing part 38. For this reason, there is a corresponding journal 47 on which the over-travel spring 41 is seated.

What is claimed is:

1. Sanitary mixing faucet comprising:
   a cartridge having an outside housing,
   a quantity adjustment means in the outside housing,
   a temperature adjustment means, and
   a thermostat means,
   wherein the quantity adjustment means has a stationary valve disk and a rotating valve disk which interacts with the stationary valve disk, wherein an inside housing is coaxially supported in the outside housing in a manner enabling coaxial rotation of the inside housing relative to the outside housing by at least 180°, wherein the thermostat means is located in the inside housing, wherein the rotating valve disk is joined to the inside housing in a manner precluding relative rotation therebetween, wherein the stationary valve disk is joined to the outside housing in a manner precluding relative rotation therebetween, and wherein an end face of the inside housing that is provided with an engagement section for seating of a first twist operating handle for adjusting a flow amount extends through an opening in an end face of the outside housing, further comprising:
   means for limiting rotation of the first twist operating handle, the means for limiting of rotation having a guide groove for guiding a first projection on the first twist operating handle, and
   a groove which runs in a lengthwise direction of the cartridge in the engagement section for interacting with a second projection on the first twist operating handle.

2. Sanitary mixing faucet as claimed in claim 1, wherein the temperature adjustment means has an engagement section which projects out of the end face of the inside housing for seating a second twist operating handle for temperature adjustment.

3. Sanitary mixing faucet as claimed in claim 2, wherein the first twist operating handle and the second twist operating handle have the same axis of rotation.

4. Sanitary mixing faucet as claimed in claim 1, wherein the valve disks have valve openings with a maximum opening cross section arises after rotation of less than 180°.

5. Sanitary mixing faucet as claimed in claim 1, wherein the valve disks have valve openings with a maximum opening cross section arises after rotation of less than about 90°.

6. Sanitary mixing faucet as claimed in claim 1, wherein markings are provided on the outside housing and on the inside housing which correspond to one another for indicating a state of rotation of the inside housing relative to the outside housing.

7. Sanitary mixing faucet as claimed in claim 1, wherein a bottom plate is mounted on a bottom of the outside housing for sealing the cartridge.

8. Sanitary mixing faucet as claimed in claim 7, wherein the bottom plate is locked to the outside housing.

9. Sanitary mixing faucet as claimed in claim 7, wherein the stationary valve disk is rotationally fixed on the bottom plate.

10. Sanitary mixing faucet as claimed in claim 1, wherein the inside housing is made of several pieces which are rotationally fixed relative to adjacent parts of the inside housing.

11. Sanitary mixing faucet as claimed in claim 1, wherein the valve disks have valve openings with a maximum opening cross section arises after rotation of less than 180°.

12. Sanitary mixing faucet as claimed in claim 11, wherein the valve disks have valve openings with a maximum opening cross section arises after rotation of less than about 90°.

13. Sanitary mixing faucet as claimed in claim 12, wherein markings are provided on the outside housing and on the inside housing which correspond to one another for indicating a state of rotation of the inside housing relative to the outside housing.

14. Sanitary mixing faucet as claimed in claim 13, wherein a bottom plate is mounted on a bottom of the outside housing for sealing the cartridge.

15. Sanitary mixing faucet as claimed in claim 14, wherein the bottom plate is locked to the outside housing.

16. Sanitary mixing faucet as claimed in claim 15, wherein the stationary valve disk is rotationally fixed on the bottom plate.

17. Sanitary mixing faucet as claimed in claim 16, wherein the inside housing is made of several pieces which are rotationally fixed relative to adjacent parts of the inside housing.

\* \* \* \* \*